Dec. 18, 1956  R. M. MANTELL ET AL  2,774,797
METHOD OF PRODUCING FLUOROHALOCARBONS BY REACTING
CARBON WITH FLUORINE AND ANOTHER HALOGEN
Filed April 2, 1954
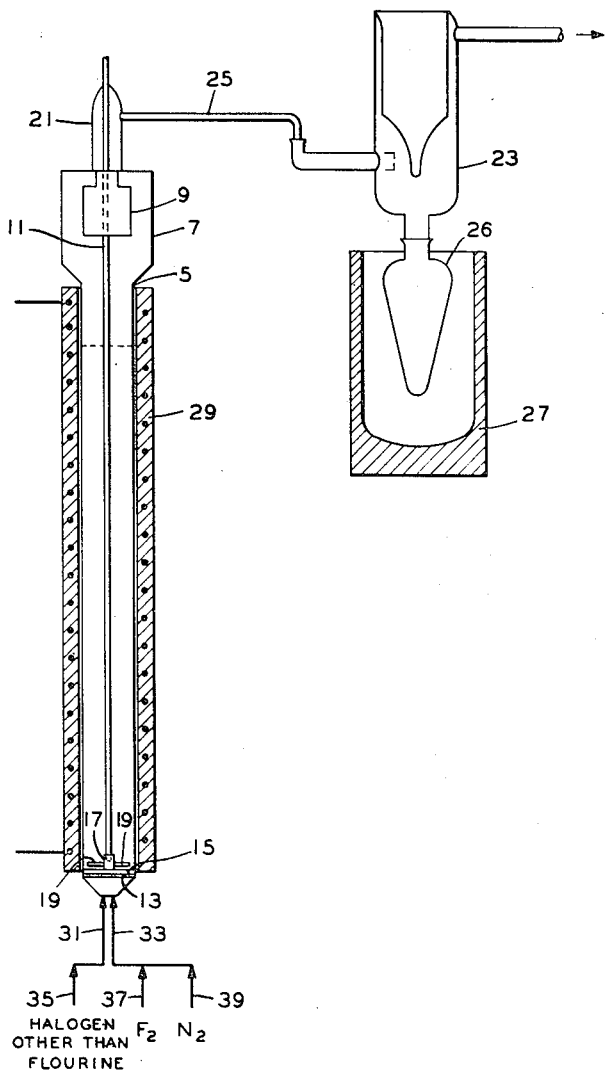
INVENTORS
RUSSELL M. MANTELL
HERBERT J. PASSINO
BY WILBER O. TEETERS
ATTORNEY

2,774,797

METHOD OF PRODUCING FLUOROHALOCARBONS BY REACTING CARBON WITH FLUORINE AND ANOTHER HALOGEN

Russell M. Mantell, Orange, Herbert J. Passino, Englewood, and Wilber O. Teeters, River Edge, N. J., assignors to The M. W. Kellogg Company, Jersey City, N. J., a corporation of New Jersey Application April 2, 1954, Serial No. 420,656

6 Claims. (Cl. 260—653)

This invention relates to an improved process and more particularly pertains to an improved method for producing fluorohalocarbons. Still more particularly, the present invention is concerned with an improved process for making fluorohalocarbons by means of a fluid system.

This application is a continuation in part of our co-pending application Serial No. 257,172, filed November 19, 1951, now Patent No. 2,684,987.

It is an object of this invention to provide an improved process for manufacturing fluorohalocarbons.

Another object of this invention is to provide an improved process for manufacturing fluorohalocarbons by means of a fluid system.

Other objects and advantages of this invention will become apparent as the description and application thereof proceeds.

In accordance with the present invention fluorocarbons are produced by the method comprising the reaction of free fluorine with carbon in the presence of free chlorine, free bromine or a mixture thereof and under suitable conditions of temperature and pressure.

Another aspect of the present invention is to produce liquid fluorohalocarbons by the method comprising the reaction of free fluorine, free bromine or a mixture thereof and under suitable conditions of temperature and pressure.

The reaction between fluorine and carbon is strongly exothermic, and thus it is difficult to control the reaction. The control of temperature is important, because equipment is rapidly corroded by fluorine at elevated temperatures. Also explosive reactions between carbon and fluorine occur at elevated temperatures. It is known that the reaction between fluorine and carbon can be conducted with greater facility if there is also present a halogen other than fluorine, see Serial No. 257,172, filed November 19, 1951. It has been found, in the present invention that the type of products obtained will vary greatly depending on whether halogen compounds or elemental halogen are used in the reaction. When a halogen compound, for example, chlorine trifluoride, is used, the reaction products comprise a mixture of fluorocarbons and fluorohalocarbons. For this type of reaction, generally, a ratio of halogen reactants will be between about 1 to 100 parts of fluorine per part of halogen other than fluorine with the preferred range being between about 1 to 10 parts of fluorine per part of halogen other than fluorine. When elemental halogens are used as reactants, for example, chlorine and/or bromine, the result is unexpected in that fluorocarbon formation is minimized and excellent yields of fluorohalocarbons are obtained. The usual ratio of reactants in this type of reaction is between about 0.25 to 100 parts of fluorine per part of halogen other than fluorine.

There are many uses for fluorohalocarbons, such as solvents, transformer fluids, refrigerants, lube oil additives, heat transfer mediums, etc. In addition fluorohalocarbons are much more reactive than fluorocarbons and are useful as intermediates in chemical reactions.

By means of the method of this invention it is possible to produce a mixture of fluorohalocarbons containing a very low percentage of fluorocarbons.

The carbon employed in the reaction may be used as a lump, granular or finely divided material. Using any kind of system, the reaction proceeds satisfactorily to produce fluorohalocarbons of the type described hereinabove. However, it was observed that the present process is conducted very effectively by means of a fluid system. In this respect, a mass of finely divided carbon having a particle size in the order of about 5 to 250 microns, preferably about 10 to about 100 microns, are situated within a suitable reaction vessel and a fluid is passed upwardly therethrough to form a fluid phase. This fluid mass is capable of exerting a fluistatic pressure, flow, etc., in a manner which is similar to a liquid. Ordinarily the reactant gas or gases may be employed for the purpose of fluidizing the mass of finely divided carbon particles. This can be accomplished by passing the reactant gases or any other inert gaseous material through the mass of finely divided carbon particles at a superficial linear gas velocity of about 0.1 to about 50 feet per second, more usually about 0.1 to about 6 feet per second. However, it is preferred to employ a superficial linear gas velocity in the order of about 1 to about 2.5 feet per second. In the range of velocities given, it is possible to produce either a dense or lean phase of carbon particles. By employing a fluid system, it is possible to control more effectively the temperature of reaction, as well as maintain a more uniform temperature throughout the fluid mass. This phenomenon is apparently due to the random, circulatory motion of the particles in the fluid mass which effects a rapid mixing between the top and bottom of the carbon bed in relatively short periods of time; and the resultant more rapid heat dissipation from the reaction zone to the effluent gases. In such a system, there is a more intimate contact between the reactant gaseous materials and the carbon, thus also resulting in substantially greater yields of halocarbons.

The carbon reactant for the present process should be substantially hydrogen-free, in the sense that it should not contain free hydrogen or compounds which will liberate or release hydrogen under reaction conditions. The presence of hydrogen causes undesirable side reactions such as the formation of corrosive hydrogen fluoride which are to be avoided because of the unfavorable influence on product yields, and further, it gives rise to problems of separating the desired products from the total product stream. In this respect, generally, the carbon reactant includes materials in the form of charcoal, such as for example, wood or sugar charcoals; coke; graphite; etc.

In the practice of our invention, it is preferred to employ an excess of carbon reactant over the amount which is theoretically required to react with the gaseous reactant materials. It was found that it is easier to control reaction conditions by maintaining the quantity of fluorine below the stoichiometric quantity which is required to react with the carbon. An excess of fluorine causes rapid reaction rates accompanied by the liberation of an unusual amount of heat which is difficult to control. On the other hand, by maintaining the amount of carbon which is present under reaction conditions in excess of the stoichiometric amount, it was found that the reaction rate can be controlled more readily, and yet substantially all of the fluorine which is fed into the reaction system is consumed. Accordingly, about .001 to about 1.0 cubic foot of fluorine (measured at 60° F. and 760 mm.) per minute per pound of carbon are employed in the present process.

For purposes of fluidization, it is preferred under certain conditions to use an inert gas, for example, nitrogen, to supplement the fluidizing effect of passing the reactant gases through a mass of carbon particles. Under some conditions, it may be desirable to employ reactant gas rates which are insufficient to effect fluidization, hence the inert gas is used to insure adequate fluidization of the carbon. The inert gas should be a material which is substantially non-reactive under reaction conditions and preferably also serve as a means for removing excess heat from the reaction zone. In this respect, the inert gas should be a material with a high specific heat in order that small amounts will be sufficient to effect the desired temperature reaction. Generally, the inert gas which can be used includes helium, nitrogen, neon, tetrafluoromethane, etc. The amount of inert gas employed will vary depending upon the needs of a particular situation. However, generally, about 1 to about 1000 cubic feet, preferably about 10 to about 100 cubic feet of inert gas (measured at 60° F. and 760 mm.) per cubic foot of fluorine is employed in the present process.

In the broadest aspect of this invention, that is, for the production of fluorohalocarbons, a temperature range between about 300° F. and about 1200° F. is used.

In another aspect of this invention it has been discovered that the reaction temperature plays an important part in determining the physical properties of the reaction products. When it is desirable to prepare a product comprising predominantly liquid fluorohalocarbons, the reaction temperature is preferably maintained at a lower level, that is, between about 500° F. and about 800° F., or more usually, between about 600° F. and about 700° F.

Ordinarily the reaction pressure is maintained between about atmospheric and about 10 p. s. i. g., preferably between about 5 and about 25 p. s. i. g.

In order to more fully understand the present invention, specific illustrations thereof will be given.

In the drawing, the reactor 5 comprises a vertical, cylindrical, Monel vessel having a diameter of approximately one inch and a length of twenty-six inches. Superimposed on reactor 5 is a settling chamber 7 which has a diameter of four inches and a length of six inches. Within the settling chamber there is situated a cylindrical, porous, sintered, Monel filter 9 which has a length of four inches and a diameter of two inches. The filter serves to remove entrained finely divided solids from the effluent reaction product. For the purpose of temperature indication in the reaction 5, a vertical, cylindrical thermowell 11 is situated within the reactor 5 in concentric fashion, and it has a length of thirty-four inches and a diameter of one-quarter inch. The thermowell contained an iron-constantan thermocouple of thirty-six inches length (not shown). At the inside bottom of reactor 5 there is located a previous Monel plate 13 which serves to support a short Monel tube 15. The Monel tube 15 has a slightly smaller external diameter than the inside of reactor 5, and a length of one inch. The Monel tube 15 was filled with one hundred mesh nickel screen (not shown). The nickel screen served to distribute the upflowing gaseous reactants uniformly over the cross-sectional area of the reactor, and also to support the bed of finely divided carbon particles. The Monel plate 13 also served to support a ¼ inch x 4 inch Monel sleeve 17 and thus it was maintained in a concentric position. The Monel sleeve 17 contained projections 19 to keep the sleeve in a concentric position within the reactor 5.

Superimposed on settling chamber 7 is an outlet chamber 21 for filtered reaction product. The outlet chamber is in concentric relation with thermowell 11. Outlet chamber 21 is connected to a Pyrex, internal, cold-finger, liquid nitrogen trap 23 which has a four inch diameter and a length of twenty inches by means of a line 25. The liquid nitrogen trap is connected to a graduated, Pyrex, Podbielniak, distillation kettle 26 of 500 mm. capacity. The kettle is placed in a dewar containing liquid nitrogen.

Heat was supplied externally to the reactor 5 by means of a 2500 watt electric jacket 29 surrounding the same. The reactant materials were charged to the bottom of the reactor 5 by means of lines 31 and 33. The halogen other than fluorine, e. g., chlorine, was charged to the system through line 35, which is connected to line 31 and fluorine and nitrogen were charged to line 33 by means of lines 37 and 39 respectively.

In operation, the pressure of the system was maintained at essentially atmospheric pressure. The finely divided carbon material was first charged to the reactor in the appropriate amount, and after attaining the desired heating through jacket 29, the reactant gases were charged thereto. The rates of reactant materials to the reactor 5 were measured by rotometers (not shown) and the pressure of the reactor 5 by means of a pressure gauge (not shown).

Using the laboratory equipment described above, experiments were made with the reactants (a) chlorine trifluoride and carbon, (b) chlorine, fluorine and carbon, (c) chlorine, bromine, fluorine and carbon and (d) chlorine, iodine, fluorine and carbon. These results are reported in Table I below.

Table 1

|  | Run | | | | | | |
|---|---|---|---|---|---|---|---|
|  | 1 | 2 | 3 | 4 | 5 | 6 | 7 |
| Reactants, cu. ft./min.: | | | | | | | |
| Diluent | 0.02 | 0.02 | 0.02 | 0.02 | 0.02 | 0.02 | 0.02 |
| $Cl_2$ | 0.01 | 0.01 | 0.01 | | | | |
| $F_2$ | 0.0048 | 0.0048 | 0.0048 | 0.005 | | | |
| $Br_2$ | | 0.004 | 0.002 | | | | |
| $I_2$ | | | | 0.0001 | | | |
| $ClF_3$ | | | | | 0.0015 | 0.0015 | 0.0015 |
| Reaction temp., ° F | 900 | 900 | 1,000 | 900 | 850 | 929 | 850 |
| Products, weight percent: | | | | | | | |
| Gases— | | | | | | | |
| Fluorocarbons | | | | 97.0 | 51.7 | 64.5 | 83.5 |
| Chlorofluorocarbons | 72.0 | (1) | 75.1 | | 5.1 | 5.4 | 4.2 |
| Bromofluorocarbons | | (1) | 3.1 | | | | |
| Liquids 4— | | | | | | | |
| Chloro- and/or Bromofluorocarbons | 28.0 | (1) | 22.8 | | } 2 43.2 | 2 30.1 | 2 12.1 |
| Fluorocarbons | | | | 3.0 | | | |
| Product distribution, weight Percent: | | | | | | | |
| Fluorocarbons | | | | 100.0 | 51.7 | 64.5 | 83.5 |
| Chloro- and/or Bromofluorocarbons | 100.0 | 100.0 | 100.0 | | 3 43.3 | 3 35.5 | 3 16.5 |

1 Variety of chlorofluorocarbons and bromofluorocarbons.
2 Mixture of chlorofluorocarbons and fluorocarbons.
3 Maximum possible yield of fluorohalocarbons.
4 Compounds having at least 5 carbon atoms.

It is noted from Table I that the reaction between carbon and chlorine trifluoride results in a mixture of fluorocarbons and chlorofluorocarbons. The percentage yield of fluorocarbons in this group of experiments (runs 5, 6 and 7) ranges between about 52 and about 84 weight percent, the variation resulting from changes in reaction temperature and halogen reaction feed rate. The data represents the minimum percentage of fluorocarbons produced since the composition of the liquid halocarbons is not broken down into fluorocarbons and fluorohalocarbons. The reactions in which the elemental chlorine and fluorine are combined with carbon, on the other hand, show no measurable production of fluorocarbons under similar operating conditions, and in those tests where both bromine and chlorine are reactants similar results are obtained. Tests were conducted also with elemental iodine and fluorine as the halogen reactants, however, the reactivity of iodine is so low that only fluorocarbons were produced. Run 4 is included to show this result. The unusual effects on products distribution of using elemental halogens, other than iodine, as reactants is however clearly illustrated by these experimental results.

Another group of experiments was conducted in which elemental chlorine and fluorine were reacted with carbon at varying temperatures. These results are reported in Table II.

Table II

| Run | Reactants, cu. ft./min. | | | Reaction temp., °F. | Products, weight percent | |
|---|---|---|---|---|---|---|
| | Diluent | $Cl_2$ | $F_2$ | | Liquid[2] | Gases |
| 1 | 0.02 | 0.01000 | 0.0048 | 900 | 28.0 | 72.0 |
| 2 | 0.02 | 0.00025 | 0.0050 | 600 | 65.0 | 35.0 |
| 3[1] | 0.02 | 0.00025 | 0.0050 | 600 | 64.0 | 36.0 |
| 4[1] | 0.02 | 0.00025 | 0.0050 | 700 | 69.0 | 31.0 |

[1] Sugar charcoal used in place of the wood charcoal used in Runs 1 and 2.
[2] Compounds having at least 5 carbon atoms.

The data contained in Table II shows the marked effect of temperature on the production of liquid fluorohalocarbons, with more than twice the weight percent of such liquid halocarbons being produced at 600° F. than at 900° F. Duplicatory tests utilizing sugar charcoal in place of wood charcoal produce confirming results in the low temperature range.

From the above data it is apparent that the use of elemental halogens as reactants produces substantially more fluorohalocarbons than does the reaction of halogen compounds under similar conditions. Also, it is proven possible to control the production of liquid halocarbons and to increase the yield of such liquid halocarbons by decreasing the temperature maintained in the reaction zone.

Having thus described our invention by furnishing specific examples, it is to be understood that no undue restrictions and limitations are to be improved by reason thereof.

Having thus described our invention, we claim:

1. A process for producing liquid fluorohalocarbons which comprises reacting elemental fluorine with a fluidized mass of finely divided carbon particles in a reaction zone maintained at a temperature between about 500° F. and about 800° F. to which zone there is charged an elemental halogen selected from the group consisting of chlorine, bromine, and mixtures thereof such that the relative quantities of reactants charged to the conversion zone are between about 0.50 and about 20 parts of fluorine per part of halogen other than fluorine by volume.

2. The process in claim 1 wherein the halogen other than fluorine is chlorine.

3. The process in claim 1 wherein the halogen other than fluorine is bromine.

4. The process in claim 1 wherein the halogen other than fluorine is a mixture of bromine and chlorine.

5. A process for producing fluorohalocarbons which comprises reacting elemental fluorine with a fluidized mass of finely divided carbon particles in a reaction zone to which zone there is charged an elemental halogen selected from the group consisting of chlorine, bromine and mixtures thereof such that the relative quantities of reactants charged to the conversion zone are between about 0.50 and about 20 parts of fluorine per part of halogen other than fluorine by volume.

6. A process for producing liquid fluorohalocarbons which comprises reacting elemental fluorine with a mass of finely divided carbon particles suspended in an inert gas in a reaction zone to which zone there is charged an elemental halogen selected from the group consisting of chlorine, bromine and mixtures thereof such that the relative quantities of reactants charged to the conversion zone are between about 0.50 and about 20 parts of fluorine per part of halogen other than fluorine by volume.

References Cited in the file of this patent

UNITED STATES PATENTS 2,684,987    Mantell et al. _____ July 27, 1954